Oct. 26, 1948.  G. V. WOODLING  2,452,278
TUBE COUPLING DEVICE
Filed June 29, 1945

INVENTOR.
BY George V. Woodling.

Patented Oct. 26, 1948

2,452,278

UNITED STATES PATENT OFFICE 2,452,278

TUBE COUPLING DEVICE

George V. Woodling, Cleveland, Ohio

Application June 29, 1945, Serial No. 602,207

7 Claims. (Cl. 285—122)

My invention relates in general to a coupling device for attaching a tube to a fitting element and including a sleeve for attachment to the fitting element and more particularly to the improvement of contractible means for engaging the tube and adapted to be contracted upon the tube by the sleeve when the sleeve is attached to the fitting element.

An object of my invention is the provision of contractible means having a tapered portion and a tail portion extending away from the small end of the tapered portion, the tail portion resiliently supporting the tube against vibration and the tapered portion constituting the sole support for the tail portion.

Another object of my invention is the provision of contractible means for engaging the tube in which the contractible means has a tail portion which functions as a resilient spring to support the tube against vibration and in which the tail portion is unsupported by the sleeve which engages the tapered portion of the contractible means.

Another object of my invention is the provision of contractible means which is metallurgically hardened whereby the tail portion is greatly strengthened so that it needs no external supporting pressure for resiliently supporting the tube.

Another object of my invention is the provision of eliminating the use of a slow taper for applying external pressure to the tail portion of the contractible means.

Another object of my invention is the provision of contractible means having an internal wall surface for engaging the tube in which the internal wall surface is provided with an internal rib which projects radially inwardly of the wall of the tube for holding the tube against longitudinal movement with reference to the contractible means.

Another object of my invention is the provision of contractible means having internal wall means for engaging the tube in which the internal wall means is provided with an internal rib which radially projects inwardly of the wall of the tube and in which at least the surface on one side of the internal rib defines substantially a cylindrical surface for frictionally engaging the tube.

Another object of my invention is the provision of a contractible means having a tapered portion and a tail portion in which the tail portion is contracted about the tube incident to the contracting of the tapered portion.

Another object of my invention is the provision on the inside of the contractible means of an internal rib which "necks" the tube for making a good gripping action therewith.

Another object of my invention is the provision of preventing the "skinning" of the tube by the internal rib of the contractible means by supporting the tube in advance of the rib and thereby blocking the displacement of metal which tends to flow in advance of the internal rib of the contractible means.

Another object of my invention is the provision of a coupling device for attachment to a tube and for use with an annular sealing means in which the coupling device includes contractible means for gripping the tube and in which the contractible means constitutes non-extrusion means to prevent the sealing means from extruding along the tube.

Another object of my invention is the provision of a coupling device for attachment to a tube and for use with annular sealing means in which the coupling device includes a washer for enclosing the sealing means in a bore surrounding the tube and in which a contractible split collar abuts against the washer for preventing the sealing means from extruding past the washer along the tube.

Another object of my invention is the provision of a split collar for gripping the tube in which the internal surface of the split collar makes both a necking engagement with the tube and a frictional engagement with the tube.

Another object of my invention is the provision of a coupling device which may be subject to a great deal of vibration without damaging the tubes.

Another object of my invention is the provision of a contractible collar which functions substantially as a lock washer to prevent the sleeve nut from becoming loose under vibration.

Another object of my invention is the provision of a contractible means which is adapted to contract about the tube and which constitutes the only means of holding the tube against longitudinal movement relative to the coupling or fitting element.

Another object of my invention is to control the amount of the contractible movement of the contractible means which engage the tube.

Another object of my invention is to prevent the parts from being assembled in the wrong way.

Another object of my invention is the provision of a contractible means which "necks" the tube but does not radially cut the tube to weaken same whereby it may break off resulting from excess vibration.

Another object of my invention is the provision of contractible means which frictionally engages the tube in advance of the place where the contractible means "necks" the tube.

Other objects and a fuller understanding of my invention may be had by referring to the following description and claims, taken in conjunction with the accompanying drawing, in which:

The contractible means or split collar in the present application constitutes an improvement of the contractible means or split collar shown in my pending patent application Serial No. 593,006, filed May 10, 1945, for Tube coupling.

Figure 1:
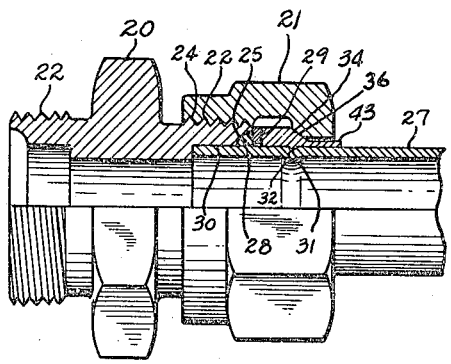
Figure 1 is a longitudinal cross-sectional view of a tube fitting having contractible means for engaging the tube embodying the features of my invention.
Figures 2, 3:
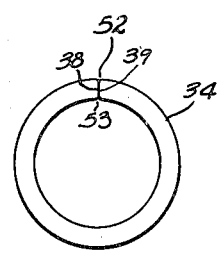
Figure 2 is a cross-sectional view of the split collar of Figure 1, taken along the line 2—2 thereof and showing the split collar in its uncontracted position.
Figure 3 is a view similar to Figure 2, with the split collar shown in its contracted position.

With reference to Figure 1 of the drawing, my invention is shown as being applied to a tube fitting or coupling device comprising a coupling or fitting element 20, a tube 27 adapted to be connected thereto, and a sleeve nut 21 into which is mounted a split collar 34 adapted to engage the tube 27. The end portions of the fitting element 20 are identical and are provided with male threads 22. The sleeve nut 21 is provided with female threads 24 for engaging the male threads 22. The left-hand end of the fitting element, as shown in Figure 1, may be screwed into a cylinder block or valve or any other apparatus having a threadable opening. The fitting element 20 may be also employed as a coupling for connecting two pipes together, in which case there would be a tube connected to the left-hand end of the fitting element 20. The end portions of the fitting element are provided with a tube bore 30 into which the end of the tube may be freely inserted. As illustrated, the end portions of the fitting element 20 are provided with an enlarged bore 25 surrounding the tube for receiving a sealing ring 28 which may be an "O" ring of a rubber-like material. A metal washer 29 surrounds the tube and makes metal-to-metal contact engagement with the end surface 33 of the fitting element. The split collar 34 abuts against the metal washer 29 and after it is once contracted by the sleeve nut 21 constitutes nonextrusion means to keep the sealing means from extruding past the washer 29 along the tube. The external surface of the split collar 34 is provided with a tapering surface 35 which is engaged within an internal annular tapering surface 36 of the sleeve nut 21. Accordingly, as the sleeve nut 21 is threadably screwed onto the fitting element 20 the annular tapering surface or wall 36 contracts the split collar 34 about the tube 27. The split in the split collar is defined by the split ends 38 and 39 as shown in Figure 2. The sleeve nut 21 is screwed onto the fitting element until the split ends 38 and 39 come together such as shown in Figure 3 of the drawing. When the split ends 38 and 39 contact each other, they limit the contractible movement of the split collar. As illustrated in Figure 2, the split ends 38 and 39 meet with the external surface of the split collar and define junctures 52 which are rounded or otherwise relieved so that the junctures do not cut into the sleeve nut whereby if they were allowed to cut into the sleeve nut they may produce chips which would lodge between the split ends 38 and 39 to prevent their complete coming together under the compression of the sleeve nut. The split ends 38 and 39 also define junctures with the internal surface of the split collar and these junctures are indicated by the reference character 53, and they may also be rounded or relieved to prevent the juncture cutting into the tube whereby chips may thereby be formed to prevent the end surfaces 38 and 39 from completely contacting each other when the split collar is being contracted by the sleeve nut 21. During the tightening of the sleeve nut 21 relative movement may occur between the external surface of the collar and the internal surface of the sleeve nut or between the internal surface of the split collar and the external surface of the tube. It is during this relative movement between the parts that the cutting action may take place as above described. Therefore, in my invention I have provided for relieving the sharp corners or junctures to prevent any cutting. The relieving of the corners or junctures is advisable when the tube or the sleeve nut is made of softer material than the split collar.

The bore 25 which receives the rubber sealing ring 28 is provided with a tapering wall 26 whereby the deeper the bore the more the support for the male threads 22. The bore 25 extends back within the fitting element for a distance substantially equal to two threads on the fitting element. For a one-half inch tube the diameter of the rubber sealing ring may be, for example, in the neighborhood of sixty-five to seventy thousandths of an inch and the mouth of the bore 25 may be substantially fifty thousandths of an inch. The distance between the mouth of the bore 25 and the root of the threads 22 may be substantially thirty thousandths of an inch.

From the above description it is noted that the dimensions are rather compacted and in order to provide support for the two end threads the sealing ring 28 is made larger in diameter than the mouth of the bore 25. The diameter of the washer 29 is slightly smaller than the root diameter of the threads 22 so that when the washer 29 presses against the end surface 33 the threads are subjected to a shearing action which threads therefore give support against the washer 29 from crushing the metal between the bottom of the threads and the tapering inner surface 26 of the bore 25. Inasmuch as the internal wall 26 of the bore tapers towards the tube as the bore recedes inwardly, an increased support is given to the metal between the bottom of the threads 22 and the bore 25, so as to avoid any collapsing of the head of the fitting element 20 as pressure is applied thereto by the washer 29 when the sleeve nut 21 is turned on tight to the fitting element 20. The washer 29 closes the rubber sealing ring 28 in the bore and protects the rubber sealing ring from being injured by the split collar 34.

Figure 4:
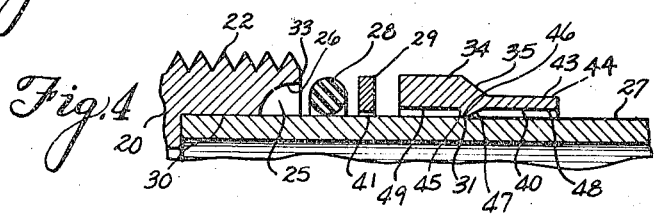
Figure 4 is an enlarged exploded fragmentary cross-sectional view of the parts shown in Figure 1 prior to assembly.

Extending from the small end of the tapered portion 35 is a tail portion 43 which may have substantially a cylindrical outer surface 44. When the split collar is contracted about the tube, the outer surface 44 of the tail portion 43 is radially spaced from and unsupported by the sleeve nut 21. The radial clearance is indicated by the reference character 54 in Figure 4. In other words, the sole support for the tail portion 43 is the integral connection of the tail portion to the tapered portion 36. The split collar is preferably metallurgically hardened or heat treated by any one of the several known methods whereby the tensile strength of the entire split collar is greatly increased. Accordingly, the tail portion 43 in rear of the tapered portion 36 functions as a resilient spring to support the tube against vibration. Since the split collar is heat treated, there is no need to externally support the tail portion by a slow taper on the sleeve nut because the tail portion is strong enough without external support from the sleeve nut. Furthermore, inasmuch as the tail portion 43 requires no external support by the sleeve nut, there is no critical manufacturing tolerance. The split collar always springs back after each disengagement of the sleeve nut and thus the fitting is easy to assemble and disassemble. Nor is the tapered portion 35 spalled or damaged resulting from repeated tightening of the sleeve nut because the hardened surface prevents any such damage.

Figure 5:
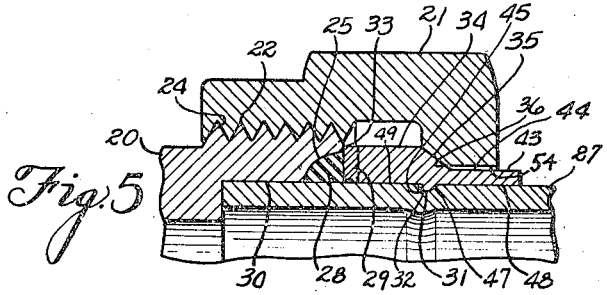
Figure 5 is an enlarged fragmentary view of the cross-section of the tube fitting shown in Figure 1.

The internal surface of the split collar is provided with an internal rib 31 which when the split collar is contracted makes a radial projecting engagement inwardly of the wall of the tube 27. The projecting radial engagement of the internal rib 31 inwardly of the wall of the tube is indicated by the reference character 32, see Figure 5. The remaining internal surfaces 48 and 49 of the split collar in rear of and in advance of the internal rib respectively are substantially cylindrical and make a good frictional engagement with the tube. The frictional engagement which is effected by the inside surface 48 of the tail portion 43 of the split collar in rear of the internal rib 31 supports the tube against vibration whereby very little vibration is carried or transmitted to the projecting radial engagement 32 of the internal rib into the wall of the tube. Tests show that this split collar will withstand a great deal of vibration whereby the tube will not break off under severe vibration tests. Since the split collar is hardened, the internal rib 31 will not flatten or damage during repeated assembly of the tube fitting. The radial dimension of the internal rib may be substantially one-half of the wall thickness of the tube, or less. For example, for a one-half inch tube having a wall thickness of thirty-five or forty-nine thousandths of an inch, the radial dimension of the internal rib may be in the neighborhood of ten to twenty thousandths of an inch. In actual practice, the radial dimension of the internal rib depends upon the duty or longitudinal pull imposed upon the tube fitting. The Figure 1 is for a one-half inch tube and is drawn substantially to double scale. The Figure 5 is drawn substantially to four times the scale for a one-half inch tube. A clearance 40 exists between the tube and the inside surfaces 48 and 49 of the split collar when the collar is uncontracted, see Figure 4. The internal rib 31 is preferably provided with a relatively sharp forward corner 45 for making radial projection inwardly of the wall of the tube. The crown part of the internal rib is preferably flat at 46 so as not to cut or weaken the tube when the split collar is contracted. The flat part may be in the order of eight to twelve thousandths of an inch long for a one-half inch tube. This dimension may likewise be varied to accommodate the duty requirements. The rear side 47 of the internal rib 31 is tapered to provide a gradual slope to relieve strain. Preferably, the crown part of the internal rib "necks" or circumferentially bends or constricts the tube. When a heavy pull is imposed on the tube the forward sharp corner 45 digs into the tube, but since there is no place for the metal of the tube in advance of the internal rib to flow, there is no "skinning" of the tube. One reason for making the internal rib relatively small in body cross-section is that it prevents twisting of the tube as the sleeve nut is turned on tight. During the stage that the internal rib 31 is being projected inwardly of the wall of the tube, the frictional engagement between the small internal rib and the tube is relatively small and there is no tendency to twist the tube during the tightening of the sleeve nut. The gap between the split end surfaces 38 and 39 of the split collar depends upon the radial dimension of the internal rib 31 and the gap may vary between 30 to 60 thousandths of an inch, so that when the split collar is fully contracted about the tube the cylindrical surfaces 48 and 49 of the internal wall means of the split collar make a good frictional engagement with the tube, preferably compressing the tube a few thousandths of an inch to give good support for the tube. The internal surface 48 in rear of the internal rib 31 supports the tube against vibration. The internal surface 49 in front of the internal rib gives good external support to the tube and prevents "skinning" of the tube, since there is no place for the displaced metal of the tube to flow in advance of the internal rib. Mechanical pull tests show that the split collar with the internal rib will withstand extremely high pulling forces, far beyond the rupturing fluid capacity of the tube. The sharp corner 45 of the internal rib digs into the tube when a longitudinal pull is imposed upon the tube. For light fluid pressures, the sharp corner digs very little into the tube. For heavy fluid pressures, the sharp corner digs harder into the tube, as the tube is forced back by the fluid pressure. For normal operating conditions, there is very little digging of the sharp corner into the tube and thus the tube will withstand a large amount of vibration.

Figure 6:
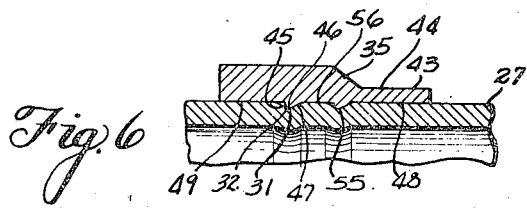
Figure 6 is an enlarged cross-sectional view of a modified split collar with two internal ribs.

While I have preferably illustrated only one such internal rib, the split collar may have a plurality of internal ribs. To this end, in Figure 6 I show a split collar having an additional rib 55 with a cylindrical space 56 between it and the internal rib 31. The cylindrical surface 56 supports the metal of the tube between the spaced ribs in order to block any "skinning" of the tube by preventing the tendency of the flow of the metal of the tube wall.

Figure 7:
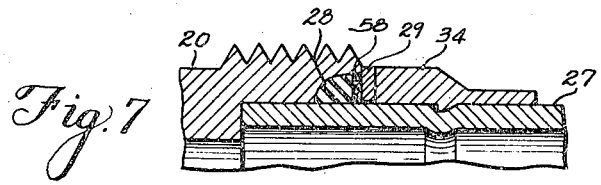
Figure 7 shows a leather washer in advance of the metal washer.

The metal washer 29 may also be metallurgically hardened or heat treated in order to render it hard to withstand the repeated use incident to assembling and dis-assembling the fitting. The washer 29 provides for enclosing the sealing ring 28 within the bore 25. A small clearance will exist between the washer 29 and the tube and this clearance is indicated by the reference character 41 and may be in the neighborhood of a few thousandths of an inch. When the rubber sealing ring 28 is subjected to high fluid pressure there is a tendency for the rubber to extrude along the tube through the clearance 41. In my invention, the split collar when contracted blocks this extrusion past the metal washer as well as grips the tube whereby the tube may be anchored to the tube fitting 20. A leather washer 58 or other non-extrusion material may be disposed in advance of the metal washer 29 to prevent or block extrusion of the rubber ring 28 into the clearance 41, see Figure 7. The leather will not extrude into the clearance 41 and thus it keeps the rubber from extruding into the clearance. The leather washer or other material would fit into the bore 25 between the rubber ring 28 and the metal washer 29. The bore 25 may be lengthened to provide additional space to receive the leather washer as well as the rubber ring 28.

The tapered surface 35 is preferably substantially in the neighborhood of 37 degrees although it may be varied from this amount depending upon the conditions desired, and tests show that with this taper there is no tendency to materially twist the tube as the sleeve nut is turned on tight.

While I have described and have given examples of dimensions with reference to a one-half inch tube, it is well understood that my invention applies to tubing of all sizes and that the dimensions which have been set forth are by way of example.

In my invention the parts are such that they cannot be assembled in the wrong direction. In addition, the split collar acts as a lock washer to keep the sleeve nut from coming loose. The split collar preferably possesses the characteristics of strong resiliency and may be made of materials such as spring steel or metallurgically hardened metal, or other metals having the desired spring characteristics.

Although I have described my invention in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A coupling device for attachment to a tube and for use with annular sealing means, said coupling device comprising a hollow fitting element having an end portion provided with an end surface, said end portion receiving the tube and having a bore surrounding the tube adjacent the end surface to receive said sealing means, and connecting means including a washer and contractible means gripping the tube for connecting the tube to the fitting element, said washer surrounding the tube and making contact engagement with the end surface of the fitting element for enclosing the sealing means in the bore, said contractible means abutting against the washer and constituting non-extrusion means to prevent the sealing means from extruding past the washer along the tube, said contractible means having internal wall means for engaging the tube, said internal wall means having an internal rib for radially projecting inwardly of the wall of the tube, said internal wall means on at least one side of the internal rib defining substantially a cylindrical surface for frictionally engaging and supporting the tube.

2. A coupling device for attachment to a tube and for use with annular sealing means, said coupling device comprising a hollow fitting element having a threaded end portion provided with an end surface, said end portion receiving the tube and having a bore surrounding the tube adjacent the end surface to receive said sealing means, a washer surrounding the tube and adapted to make contact engagement with the end surface of the fitting element, said washer enclosing the sealing means in the bore, and connecting means including a sleeve nut threadably engageable with the fitting element and having a split collar therein for connecting the tube to the fitting element, said sleeve nut and said split collar having engaging cam surface means for contracting the split collar about the tube, said split collar abutting against the washer and constituting non-extrusion means to prevent the sealing means from extruding past the washer along the tube, said split collar having internal wall means for engaging the tube, said internal wall means having an internal rib for radially projecting inwardly of the wall of the tube, said internal wall means on at least one side of the internal rib defining substantially a cylindrical surface for frictionally engaging and supporting the tube.

3. A coupling device for attachment to a tube and for use with annular sealing means, said coupling device comprising a hollow fitting element having an end portion provided with an end surface, said end portion receiving the tube and having a bore surrounding the tube adjacent the end surface to receive said sealing means, and connecting means including contractible means gripping the tube for connecting the tube to the fitting element, said contractible means abutting against the end surface of the fitting element and constituting non-extrusion means to prevent the sealing means from extruding out of the bore, said contractible means having internal wall means for engaging the tube, said internal wall means having an internal rib for radially projecting inwardly of the wall of the tube, said internal wall means on at least one side of the internal rib defining substantially a cylindrical surface for frictionally engaging and supporting the tube.

4. A coupling device for attachment to a tube and for use with annular sealing means, said coupling device comprising a hollow fitting element having an end portion provided with an end surface, said end portion receiving the tube and having a bore surrounding the tube to receive said sealing means, and connecting means including a sleeve for attachment to the fitting element and a split cam ring within the sleeve for gripping the tube to connect the tube to the fitting element, said split cam ring having a tapered outer surface adapted to be engaged by the sleeve for urging the split cam ring toward the end surface of the fitting element and thereby contracting said split cam ring about the tube, said split cam ring having an inner surface firmly gripping and supporting the tube against vibration substantially throughout the entire length of said inner surface.

5. A coupling device for attachment to a tube and for use with annular sealing means, said coupling device comprising a hollow fitting element having an end and a bore to receive the tube and said sealing means, and connecting means including contractible means for gripping the tube to connect the tube to the fitting element, said contractible means and said end of the fitting element having annular opposed surfaces for resisting relative pressing forces between the contractible means and the end of the fitting element, said contractible means constituting non-extrusion means for the sealing means and having internal wall means for engaging the tube, said internal wall means having an internal rib for projecting inwardly of the wall of the tube, said internal wall means on at least one side of the internal rib defining substantially a cylindrical surface for frictionally engaging and supporting the tube.

6. A coupling device for attachment to a tube and for use with annular sealing means, said coupling device comprising a hollow fitting element having an end and a bore to receive the tube and said sealing means, and connecting means including contractible means for gripping the tube to connect the tube to the fitting element, said contractible means and said end of the fitting element having annular opposed surfaces for resisting relative pressing forces between the contractible means and the end of the fitting element, said contractible means having internal wall means for engaging the tube, said internal wall means having an internal rib for projecting inwardly of the wall of the tube, said internal wall means on at least one side of the internal rib defining substantially a cylindrical surface for frictionally engaging and supporting the tube.

7. In a coupling device for attaching a tube to a threaded fitting element, the improvement of connecting means for connecting the tube to the fitting element, said connecting means including a coupling nut and a contractible cam ring, said cam ring having a tapered cam portion and a tail portion extending away from the cam portion, said cam portion being adapted to be engaged by the coupling nut for contracting the cam ring about the tube, said cam ring having an outer surface and an inner surface, said outer surface of the tail portion in the contracted position of the cam ring being radially spaced from and unsupported by the nut, said inner surface of the cam ring firmly gripping and supporting the tube and having an internal rib for projecting into the wall of the tube, said inner surface on at least one side of the internal rib defining substantially a cylindrical surface for frictionally engaging the tube.

GEORGE V. WOODLING.

REFERENCES CITED

The following references are of record in the file of this patent:

UNITED STATES PATENTS

| Number | Name | Date |
|---|---|---|
| 1,888,343 | Bohlman et al. | Nov. 22, 1932 |
| 2,139,413 | Kreidel | Dec. 6, 1938 |
| 2,201,404 | Kreidel | May 21, 1940 |
| 2,230,116 | Kreidel | Jan. 28, 1941 |
| 2,398,618 | Chavayda | Apr. 16, 1946 |
| 2,412,664 | Wolfram et al. | Dec. 17, 1946 |

FOREIGN PATENTS

| Number | Country | Date |
|---|---|---|
| 687,767 | Germany | Jan. 11, 1940 |
| 783,870 | France | July 19, 1935 |